US008434424B2

(12) United States Patent
Björk et al.

(10) Patent No.: US 8,434,424 B2
(45) Date of Patent: May 7, 2013

(54) METHOD AND MILKING STATION FOR MILKING ANIMALS

(75) Inventors: Anders Björk, Norsborg (SE); Gunnar Pettersson, Björklinge (SE)

(73) Assignee: DeLaval Holding AB, Tumba (SE)

( * ) Notice: Subject to any disclaimer, the term of this patent is extended or adjusted under 35 U.S.C. 154(b) by 1211 days.

(21) Appl. No.: 10/593,156

(22) PCT Filed: Mar. 17, 2005

(86) PCT No.: PCT/SE2005/000385
§ 371 (c)(1),
(2), (4) Date: Sep. 18, 2006

(87) PCT Pub. No.: WO2005/092084
PCT Pub. Date: Oct. 6, 2005

(65) Prior Publication Data
US 2007/0215051 A1     Sep. 20, 2007

(30) Foreign Application Priority Data
Mar. 25, 2004  (SE) ...................................... 0400778

(51) Int. Cl.
  *A01J 3/00*  (2006.01)
  *A01J 5/00*  (2006.01)
(52) U.S. Cl.
  USPC ........................................................ 119/14.02
(58) Field of Classification Search ............... 119/14.01, 119/14.02
See application file for complete search history.

(56) References Cited

U.S. PATENT DOCUMENTS

| 5,769,023 A | * | 6/1998 | van der Lely et al. | ..... 119/14.02 |
| 5,778,820 A | * | 7/1998 | van der Lely et al. | ..... 119/14.18 |
| 6,263,832 B1 | * | 7/2001 | van den Berg | ............. 119/14.08 |
| 6,543,381 B1 | * | 4/2003 | Birk et al. | ................... 119/14.08 |
| 6,651,585 B2 | * | 11/2003 | van den Berg | ............. 119/51.02 |

FOREIGN PATENT DOCUMENTS

| EP | 0792579 | 9/1997 |
| EP | 1246096 | 10/2002 |
| WO | 0013499 A1 | 3/2000 |
| WO | 01/93666 | 12/2001 |

OTHER PUBLICATIONS

International Preliminary Examination Report for corresponding International Application No. PCT/SE2005/000385 dated Sep. 26, 2006.

(Continued)

*Primary Examiner* — Monica Williams
(74) *Attorney, Agent, or Firm* — Young & Thompson

(57) ABSTRACT

A method for milking animals in a milking station (9) including a milking machine (14) for milking said animals, and a first feeding device (21) for feeding said animals intermittently or continuously with feed, is disclosed, the method comprising the steps of allowing a milking animal to enter the milking station (9); feeding the milking animal in the milking station intermittently or continuously with feed by means of the first feeding device (21); and milking the milking animal in the milking station (9) by means of the milking machine (14). According to the present invention, the feeding of the milking animal is terminated at a non-final stage of the milking in order to secure that the milking animal has terminated to consume the feed when the milking is finished.

11 Claims, 1 Drawing Sheet

OTHER PUBLICATIONS

"Automatic Milking—Changes and Chances". Kees de Koning et al. Proceedings of the British Mastitis Conference (2002) Brockworth, pp. 68-80 Institute for Animal Health/Milk Development Council.

International Search Report (PCT/ISA/210), Jun. 2005.
European Office Action dated Mar. 2, 2012, from corresponding EP application.

* cited by examiner

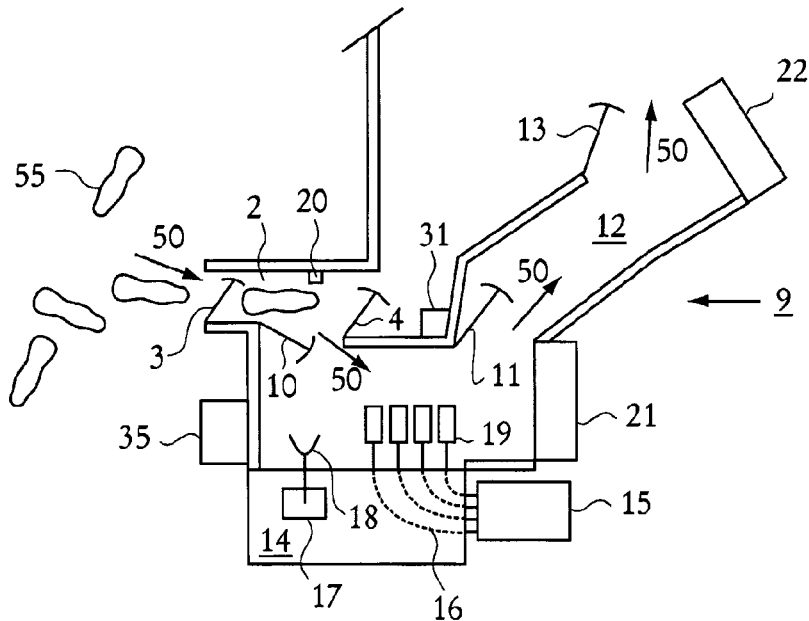
Fig. 1
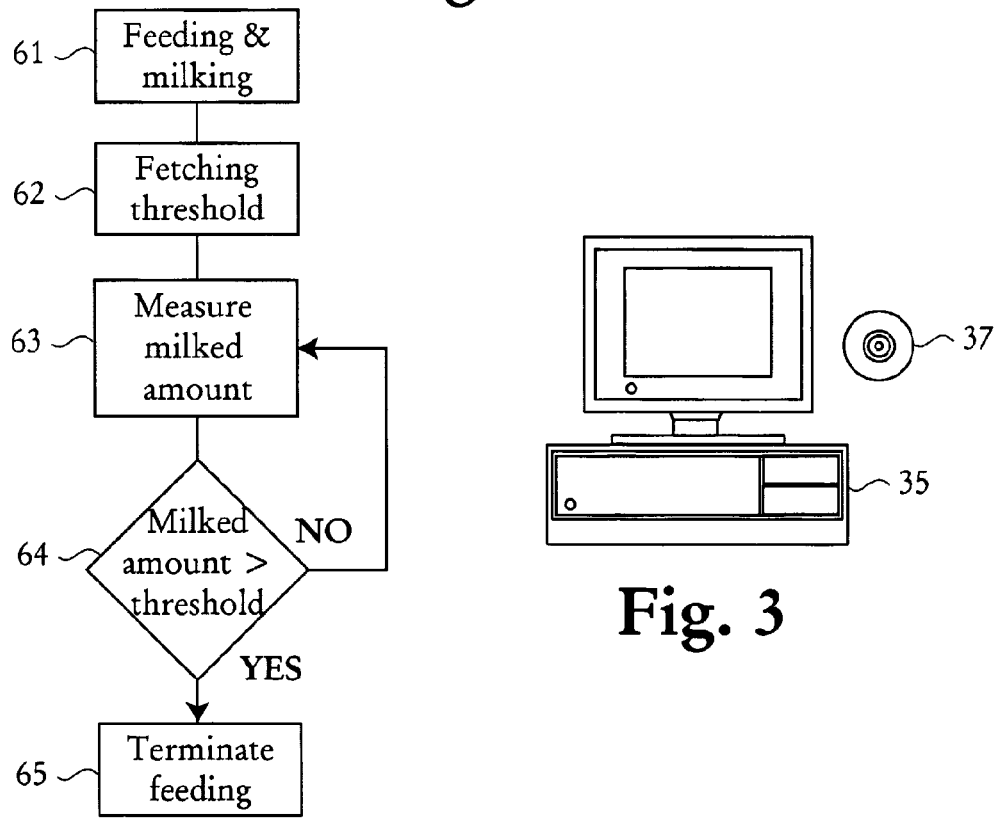
Fig. 2
Fig. 3

METHOD AND MILKING STATION FOR MILKING ANIMALS

TECHNICAL FIELD OF THE INVENTION

The present invention relates generally to dairy farming and to milking of dairy animals therein. Particularly, the invention relates to a method for milking animals in a milking station, to a computer program product for initiating the method when being run on a computer, to a computerized system for controlling and monitoring the milking station, which system is provided with the computer program product, and to the milking station itself.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time by increasing the throughput of cows in the milking facility. A major trend in this respect is an increased degree of automation of the various activities. For instance, machine milking may be performed by milking robots in a completely automated manner. Such an automatic milking system may take care of milking, feeding, milk inspection, milk sampling, animal traffic, etcetera in a large area wherein the dairy animals are moving and are visiting the milking machine voluntarily.

An automated milking machine involves heavy expenditure and has a limited milk harvesting capacity. Thus, animals having a high milk production should be allowed to be milked more often than animals having a low milk production. The operation and use of an automated milking machine, which animals are visiting on a voluntary basis, in order to obtain an optimum overall dairy farm performance is an arduous task. An objective is here to safeguard maximum milk production, while, naturally, ethical aspects as well as animal care are considered.

WO 01/93666 (DELAVAL HOLDING AB) discloses a method of automatically milking animals, such as cows, which are allowed to move freely in an area intended therefore and to visit individually a milking station comprising a fully automatic milking machine and an animal identification system. The milking station may comprise a feeding device provided in the front end of the milking station, the purpose of which being to entice a cow to enter the milking station and to make her stand still during at least the attachment of the teat cups.

K. de Koning and Y. van de Vorst state in Automatic milking changes and chances, Proceedings of the British Mastitis Conference (2002) Brockworth, pp 68-80 Institute for Animal Health/Milk Development Council, that automatic milking relies on the cow's motivation to visit the automatic milking system more or less voluntarily. The main motive for a cow to visit the automatic milking system is the supply of concentrates; therefore automatic milking systems are typically equipped with concentrate dispensers.

SUMMARY OF THE INVENTION

Concentrate feed dispensers for use in automatic milking systems include those that supplies feed to the cow more or less continuously during milking. Typically, a screw-type of feeder supplies the feed intermittently, e.g. every twentieth second.

The inventors of the present invention have surprisingly noted that, while such feeding in a milking station in deed do entice the cows to visit the milking station, the period of time the cows stay in the milking station after that the milking has been completed tends to be long simply because the cows want to consume all concentrate feed that has been supplied to them. When the feeding is terminated at the time of finishing the milking, an amount of supplied concentrate feed has most likely not yet been consumed by the cow. A cow consumes 200-400 g/min of concentrate feed, and thus the delay may not be negligible.

Further, if the amount of concentrate feed, which the cow consumes, is monitored and controlled on a cow individual basis, and the cow leaves the milking station without having consumed all concentrate feed, one looses track on the feed consumption for this cow as well as for the subsequent cow, which enters the milking station.

Still further, if only very small amounts of concentrate feed is used to entice the cow to enter the milking station, the feed may be running short early, and as a consequence the cow may not stay still and calm during the milking process. The enticing may be more difficult, and the milking stimulation may be lowered. Furthermore, concentrate feed or a higher amount of concentrate feed has to be given to the cows elsewhere.

It is therefore an object of the present invention to provide a method for milking animals in a milking station including a milking machine for milking the animals and a feeding device for feeding the animals intermittently or continuously with feed, which method remedies the problems discussed above and thus provides for an optimum utilization of the milking machine and thus for an optimum milk production.

It is a further object of the invention to provide such a method, which is accurate, efficient, reliable, of low cost, and easy to implement.

It is still a further object of the present invention to provide a computer program product for initiating a method of the above-kind when being run on a computer, and a computerized system provided with such a computer program product.

It is yet a further object of the present invention to provide a milking station for milking animals, which remedies the problems discussed above and which is accurate, efficient, reliable, of low cost, and easy to install.

These objects, among others, are attained by the methods, the computer program product, the computerized system, and the milking stations as defined in the appended patent claims.

Further characteristics of the invention and advantages thereof, will be evident from the detailed description of preferred embodiments of the present invention given hereinafter and the accompanying FIGS. 1-3, which are given by way of illustration only and thus, are not limitative of the present invention.

In the following detailed description the milk producing animals are cows. However, the invention is not limited to cows, but is applicable to any animals having the capability of producing milk, such as sheep, goats, buffaloes, horses, etc.

BRIEF DESCRIPTION OF THE DRAWINGS

FIG. 1 illustrates schematically a milking station for automatically milking cows according to a preferred embodiment of the present invention.

FIG. 2 is a flow scheme of a method for milking cows in the milking station of FIG. 1 according to a preferred embodiment of the present invention.

FIG. 3 illustrates schematically a computerized system for controlling and monitoring the milking station of FIG. 1, and a computer program product provided for initiating a method for milking cows according to the present invention when being run on the computerized system.

DETAILED DESCRIPTION OF PREFERRED EMBODIMENTS

FIG. 1. illustrates schematically a milking station 9 arranged for voluntary milking of cows 55 at a dairy farm, i.e. the cows 55 enter the milking station 9 in order to be milked when they want to or need to. The milking station 9 comprises an enclosure having an entry gate 10 and an exit gate 11. Before, the entry gate 10 there may be provided a selection box 2 provided with an entrance gate 3 for entrance of cows and an exit gate 4 for exit of cows not allowed to pass through the entry gate 10.

Outside the exit gate 11 there may be an exit space 12 to be passed by the cow leaving the milking station. The exit space 12 comprises a further exit gate 13.

The milking station 9 comprises an automatic milking machine 14 connected to an end unit 15 by means of schematically indicated milk lines 16. The milking machine 14 includes an automatic handling device 17 having a robot arm 18 arranged to automatically apply teat cups 19 of the milking machine 14 to the teats of a cow present in the milking station 9.

Furthermore, the milking station 9 comprises a cow identification device 20 provided to identify a cow presenting herself at the milking station 9. All of the gates 3, 4, 10, 11 and 13 are controllable by means of a schematically disclosed gate control device 31.

Further, the automatic handling device 17 and the gate control device 31 are connected to a central processing and control device 35. In an alternative version, the gate control device 31 may be integrated in the central processing and control device 35.

The central processing and control device 35 is responsible for central processing and controlling of the milking station 9, and comprises typically a microcomputer, suitable software, and a database of the cows 55 at the dairy farm. The database includes for each cow an assigned and dynamically updated milking priority, which indicates the degree of appropriateness or suitability that the cow shall be milked.

Thus a cow approaching the milking station 9 enters the selection box 2 through the gate 3 and is identified by the identification device 20. Depending on the milking priority of the cow, the entry gate 10 may be opened to give access to the milking machine 14, or the gate 4 may be opened so that the cow can leave the milking station 9 without being milked.

Before the milking of a cow that has entered the milking station 9 begins, the teats of the cow are typically cleaned by an automatic cleaning device (not illustrated). Then, the automatic handling device 17 applies automatically the teat cups 19 of the milking machine 14 to the teats of the cow.

During milking, milk is drawn from the teats of the cow by means of vacuum applied to the teat cups 19 via the milk lines 16. The milk drawn is measured by means of one or several milk meters (not illustrated), after which it is collected in the end unit 15. Each teat cup may be connected individually by means of the respective milk line 16 to the end unit 15, from which the milk is pumped to a cooled storage tank (not illustrated). Further, the milking may be started and ended separately for different ones of the teats or udder quarters of the cow, and the milk from there may be measured individually. The milking may be terminated for each udder quarter individually when the milk flow from there decreases under a given flow threshold value or when a preset milking time has lapsed. After the milking has been completed the exit gates 11 and 13 are opened and the cow may leave the milking station 9.

In FIG. 1 arrows 50 indicate schematically the movement of cows 55 through the milking station 9. The milking station 9 may be arranged in an area divided into an area mainly for resting and one area mainly for feeding wherein the cows 55 have to pass through gate 3 in order to move from the resting area to the feeding area. The flow of cows 55 through the milking station 9 is hereby encouraged.

The milking station 9 comprises a first feeding device 21 provided in the front end of the milking station 9 and optionally a second feeding device 22 provided in the front end of the exit space 12. The feeding devices are arranged to supply concentrate feed to the cows 55 continuously or intermittently during a first part of the milking process. The feeding may start before a cow actually enters the milking station 9, or in connection therewith. Typically, the feeding devices 21, 22 are feed dispensers provided with a screw-type of feeder, and are suitably arranged for computer-controlled feeding of the cows in the milking station.

Purposes of the first feeding device 21 may be to entice the cow to enter the milking station 9, to make her standing calm and still during at least the attachment of the teat cups 19, to distract the cow, to stimulate the milking process, and to give her all concentrate feed, or at least a portion of the concentrate feed, she needs on a daily basis.

A purpose of the optional second feeding device 22 may be to entice the cow to leave the milking station 9 after the milking has been finished or is interrupted for any reason. Additionally, the second feeding device 22 may be provided to give the cow additional concentrate feed up to a limit where the cow does not need to be given concentrate feed elsewhere at the dairy farm.

Alternatively, other feed than concentrate feed, such as e.g. molasses, is given to the cows by means of the feeding devices 21, 22.

According to the present invention the feeding of the cow in the milking station 9 by the first feeding device 21 is terminated at a selected non-final stage of the milking in order to secure that the cow has terminated to consume the feed when the milking is finished. The cows are taught that when milking is finished it is time to leave the milking station 9. In such a manner a maximum amount of feed, particularly concentrate feed, can be given to the cow in the milking station 9 during milking without that any delay due to feeding after that milking is finished. Thus, the termination of the feeding at the selected non-final stage of the milking provides for an optimum utilization of the milking machine 14 and thus also for an optimum milk harvesting at the dairy farm due to an increased throughput of cows in the milking station 9.

Further, if the amounts of concentrate feed, which the cows consume, are monitored and controlled on a cow individual basis one keeps track on the feed consumption for the cows and optimized feeding of the cows may be carried out.

The selected non-final stage of the milking, at which the feeding of the cow in the milking station 9 is terminated, may be related to, or depend on, any actions performed during the teat cleaning or the milking of the cow. For instance, the feeding may be terminated when the teat cleaning is started or ended, when the first or last one of the teat cups 19 have been applied to the teats of the cow, when milk is started to be drawn through the milk lines 16, when milking is commenced for the last one of the teat cups 19 to be applied to the teats of the cows, or when milking is finished for one, two or three of the udder quarters.

Preferably, however, the selected non-final stage of the milking, at which the feeding of the cow in the milking station 9 is terminated, is given as a stage of the milking, at which a given percentage of an expected milk yield has been drawn from the cow. Such preferred embodiment is illustrated in the flow scheme of FIG. 2.

In a step 61, the cow in the milking station 9 is fed by the first feeding device 21 and is milked according to the description above. A selected or given percentage, such as e.g. 75%, of an expected milk yield for the cow for the milking in question is, in a step 62, fetched. The expected milk yield is a measure that is commonly calculated in automatic milking systems. The selected or given percentage can be fixed or calculated from the amount of feed supplied, the historical or past feed consumption rate of the cow, and the progress of the milking process. A certain safety margin should be used. Then, during milking, the amount of milk drawn from the cow is, in a step 63, measured, e.g. by weighing the milk, by measuring the milk flow, or by measuring the total milk volume. In a step 64, the amount of milk drawn is compared with the selected or given percentage of the expected milk yield. If the amount of milk drawn exceeds the selected or given percentage of the expected milk yield, the feeding is, in a step 65, terminated. If the amount of milk drawn does not exceed the selected or given percentage, the algorithm is returned to step 63, i.e. the steps 63 and 64 forms a closed loop until the amount of milk drawn exceeds the selected or given percentage of the expected milk yield.

It shall be appreciated that the above method may be performed on a teat or udder quarter individual basis. Thus, an expected milk yield is determined for each of the teats of the cow for the milking in question, wherein the selected non-final stage of the milking, at which the feeding of the cow is terminated, is given as a stage of the milking, at which a given percentage of one, two, three, or all four of the expected milk yields has been drawn from the cow. The percentage value may be selected differently for each teat of the cow.

In another slightly modified method of the present invention, a time left to complete the milking is determined repeatedly during the milking, e.g. based on an expected milk yield for the cow for the milking in question, the actual milk yield, which has been drawn from said milking animal, and the progress of the milking, e.g. the flow rates of milk. The selected non-final stage of the milking, at which the feeding of the cow is terminated, is then determined as a stage of the milking, at which a selected or given time is left to complete the milking.

It shall be appreciated that the methods of the present invention can be performed completely individually for each cow allowed to enter the milking station 9.

Furthermore, a cow may be fed intermittently or continuously with feed in the exit space 12 by means of the second feeding device 22, while a further cow is allowed to enter the milking station 9, and be milked therein by means of the milking machine 14. According to the invention the feeding of the cow in the exit space 12 is terminated at a further selected non-final stage of the milking of the cow in the milking station 9 in order to secure that the cow in the exit space 12 has terminated to consume the feed when the milking of the cow in the milking station 9 is finished. This further selected non-final stage, at which the feeding of the cow in the exit space 12 by the second feeding device 22 is terminated, is preferably earlier than the selected non-final stage, at which the feeding of the cow in the milking station 9 by the first feeding device 21 is terminated, in order to render it most likely that the cow in the exit space 12 has already left the exit space 12 when the milking of the cow in the milking station 9 is finished and when the cow therein should leave the milking station 9 immediately.

FIG. 3 illustrates finally the computerized system 35 provided for controlling and monitoring the milking station 9 of FIG. 1, and a computer program product 37 stored e.g. a CD or DVD disk, and provided for initiating any of the methods for milking cows according to the present invention when being run on the computerized system 35.

The invention claimed is:

1. A method for milking of milking animals in a milking station (9) which includes a milking machine (14) and a first feeding device (21), the method comprising the steps of:
    allowing a first animal to enter the milking station (9), via an entry of the milking station (9);
    feeding feed to the first animal in the milking station (9) using the first feeding device (21), the first feeding device arranged to supply the feed to the first animal and to be stopped to thereby stop supplying the feed to the first animal;
    milking the first animal in the milking station (9) using the milking machine (14), the milking step comprising i) drawing milk individually from each teat of the first animal, ii) measuring a respective draw of milk from each of the teats of the first animal, and iii) determining from the measured respective draws of milk from the teats of the first animal when the milking of at least an individual one of the teats is finished; and
    terminating the feeding of the first animal at a non-final stage of the milking step by stopping the first feeding device, in order to secure that the first animal has terminated consuming the feed when the milking step is finished, wherein, the non-final stage of the milking step occurs when said determining step determines that the milking of at least an individual one of the teats of the first animal is finished.

2. The method of claim 1, wherein, the milking station (9) includes an exit space (12) that has to be passed by the animal when leaving the milking station, the exit space being provided with a second feeding device (22) for feeding the animal with feed; and the method comprises the further steps of:
    allowing the first animal to enter the exit space after the milking step has been finished;
    further feeding the first animal with feed in the exit space using the second feeding device (22), the second feeding device arranged to supply feed to the first animal and to stop supplying feed to the first animal;
    allowing a further animal to enter the milking station (9);
    milking the further animal in the milking station (9) using the milking machine (14), the step of milking of the further animal comprising i) drawing milk individually from each teat of the further animal, ii) monitoring a respective draw of milk from each of the teats of the further animal, and iii) determining from the monitored respective draws of milk from the teats of the further animal when an individual one of the teats of the further animal is finished milking; and
    terminating the feeding of the first animal in the exit space at a non-final stage of the milking of the further animal by stopping the second feeding device, in order to secure that the first animal in the exit space has terminated consuming the feed when the milking step of the further animal is finished, wherein, the non-final stage of the milking step of the further animal occurs when said determining step determines that milking is finished for at least an individual one of the teats of the further animal.

3. The method of claim 2, wherein the steps of the method is performed individually for each animal allowed to enter the milking station (9).

4. The method of claim 1, wherein,
the milking station (9) is an automated milking system,
the milking machine (14) is an automatic milking machine provided for automatically milking the animals, and
the first feeding device (21) is an automatic feeding device arranged for automatically supplying the feed to the animals intermittently or continuously; and
each step of the method is performed automatically.

5. The method of claim 1, wherein,
in said step of terminating the feeding of the first animal at the non-final stage of the milking step, the non-final stage of the milking step occurs when said determining step determines that the milking of exactly one of the teats of the first animal is finished.

6. A computerized system (35) for controlling and monitoring a milking station, the computerized system being provided with the computer program readable medium of claim 5.

7. The method of claim 1, wherein,
in said step of terminating the feeding of the first animal at the non-final stage of the milking step, the non-final stage of the milking step occurs when said determining step determines that the milking of exactly two of the teats of the first animal is finished.

8. The method of claim 1, wherein,
in said step of terminating the feeding of the first animal at the non-final stage of the milking step, the non-final stage of the milking step occurs when said determining step determines that the milking of exactly three of the teats of the first animal is finished.

9. A non-transitory computer readable medium storing a computer program product (37) loadable into an internal memory of a computer (35) and comprising software code portions, when executed on the computer, causing the computer to perform each of the steps of claim 1.

10. A milking station (9) for animals including:
an entry arranged to allow a first animal to enter the milking station (9);
a milking machine (14) comprising elements arranged for milking the first animal, the milking machine further comprising elements arranged for i) drawing milk individually from each teat of the first animal, and ii) measuring a respective draw of milk from each of the teats of the first animal for determining from the measured respective draws of milk from the teats of the first animal when milking of at least an individual one of the teats is finished;
a first feeding device (21) arranged i) to supply feed to the animal, and ii) to be stopped to thereby stop supplying the feed to the first animal; and
a control unit controlling the milking machine and the first feeding device, the control unit stopping the first feeding device (21) at a non-final stage of the milking of the first animal, securing that the first animal has terminated consuming the feed when the milking step is finished, the non-final stage being determined from the measured respective draws of milk from the teats of the first animal that the milking of at least an individual one of the teats is finished.

11. The milking station of claim 10, wherein,
the milking station (9) is an automated milking system;
the milking machine (14) is an automatic milking machine arranged to automatically milk the animals; and
the first feeding device (21) is an automatic feeding device provided for automatically feeding the animals intermittently or continuously with the feed, and for automatically terminating the feeding of the animal at the non-final stage of the milking.

* * * * *

UNITED STATES PATENT AND TRADEMARK OFFICE
CERTIFICATE OF CORRECTION

PATENT NO.         : 8,434,424 B2                                      Page 1 of 1
APPLICATION NO. : 10/593156
DATED              : May 7, 2013
INVENTOR(S)        : Björk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this
Eighth Day of September, 2015

Michelle K. Lee
*Director of the United States Patent and Trademark Office*